(12) United States Patent
Cortes Roque et al.

(10) Patent No.: US 8,226,872 B2
(45) Date of Patent: Jul. 24, 2012

(54) METHOD FOR POLYURETHANE BONDING DURING AND AFTER OVERMOLDING

(75) Inventors: Miguel Omar Cortes Roque, Apodaca (MX); Roberto Carlos Garcia Cardona, Clenega de Flores (MX); Alonso Loa Almaguer, San Nicolas de los Garza (MX); Robert Hugh Dobrow, McKinney, TX (US); Hector Eloy Mendoza Alvarado, Monterrey (MX); Alfredo Haros Hernandez, Monterrey (MX); Antonio Leal Morales, Monterrey (MX)

(73) Assignee: Grote Industries, Inc., Madison, IN (US)

( * ) Notice: Subject to any disclaimer, the term of this patent is extended or adjusted under 35 U.S.C. 154(b) by 209 days.

(21) Appl. No.: 12/689,061

(22) Filed: Jan. 18, 2010

(65) Prior Publication Data

US 2011/0177720 A1 Jul. 21, 2011

(51) Int. Cl.
*B29C 45/14* (2006.01)
(52) U.S. Cl. ........ 264/261; 264/263; 264/275; 264/265; 264/262
(58) Field of Classification Search ........................ None
See application file for complete search history.

(56) References Cited

U.S. PATENT DOCUMENTS

| | | | | |
|---|---|---|---|---|
| 4,043,851 A | * | 8/1977 | Holladay et al. | 156/47 |
| 4,395,375 A | * | 7/1983 | Ferris et al. | 264/40.1 |
| 4,670,009 A | * | 6/1987 | Bullock | 604/533 |
| 5,012,125 A | * | 4/1991 | Conway | 307/149 |
| 5,364,292 A | * | 11/1994 | Bethurum | 439/607.02 |
| 5,724,730 A | * | 3/1998 | Tanaka | 29/868 |
| 7,273,577 B2 | * | 9/2007 | Flynn et al. | 264/261 |
| 7,390,210 B2 | * | 6/2008 | Corona | 439/281 |
| 7,785,123 B2 | * | 8/2010 | Corona | 439/281 |
| 2008/0108243 A1 | * | 5/2008 | Corona | 439/352 |
| 2008/0254663 A1 | * | 10/2008 | Corona | 439/281 |

* cited by examiner

*Primary Examiner* — Edmund H. Lee
(74) *Attorney, Agent, or Firm* — Woodard, Emhardt, Moriarty, McNett & Henry LLP (57) ABSTRACT

An electrical apparatus according to the present disclosure comprises a molded device having a molded portion and being formed via an overmolding process. The electrical apparatus includes a wire set at least partially overmolded within the device, the wire set having an outer sheath surrounding a plurality of wires. The molded portion surrounds a portion of the wire set. The electrical apparatus further includes polyurethane bonding material occurring between the outer sheath and the molded portion. The polyurethane bonding material bonds at least a portion of the wire set to the molded portion during the overmolding process.

15 Claims, 7 Drawing Sheets

METHOD FOR POLYURETHANE BONDING
DURING AND AFTER OVERMOLDING

FIELD OF THE DISCLOSURE

The present disclosure relates to overmolding an electrical circuit, and more particularly to a system and method for polyurethane bonding during and/or after overmolding of the circuit.

BACKGROUND OF THE DISCLOSURE

It is well known to form molded items through use of a die mold assembly. Often times, the molded items encapsulate components via placement of the components in the die mold cavity prior to overmolding. In some cases, it may also be desirable to provide for or otherwise enhance the bonding of components encapsulated within the molded item. In the past, various types of glues have been used as bonding agents during the overmolding process, such as cyanoacrylate-based glues as an example. However, such glues have been shown to cause brittleness or otherwise degrade the material on which they are applied. Additionally, solvents such as acetone and cyclohexanone, as examples, have been used to clean the component to be overmolded in an attempt to enhance the bonding affect. However, such solvents are often hazardous to the user's health and the environment and are required to be applied immediately prior to the overmolding process to ensure that the solvents do not lose effectiveness through handling of the components and other activities. Other techniques such as sand blasting the component prior to overmolding have been attempted, however such techniques also require application immediately prior to the overmolding process to ensure effectiveness.

There is therefore a need for a system and method to improve in an overmolded item. The present disclosure is directed toward systems and methods which meet this and other needs.

SUMMARY OF THE DISCLOSURE

In certain embodiments, a molded item may be prepared by a process comprising providing a wire set including an outer sheath surrounding a plurality of wires, the outer sheath having an outer surface. The process includes applying a polyurethane bonding material to at least a portion of the outer surface of the outer sheath and positioning at least a portion of the wire set with polyurethane bonding material within a mold cavity of a molding die. The process further includes overmolding the portion of the wire set within the molding die to form the molded item, wherein the overmolding includes filling the mold cavity with molten material configured to harden into overmold. The molten material produces an amount of heat and the heat operates to activate the polyurethane bonding material to bond the wire set with the overmold within the molded item.

In other embodiments, a method comprises providing a wire harness having a wire jacket surrounding at least one wire, the wire jacket having an outer surface. The method includes applying a polyurethane bonding material to at least a portion of the outer surface of the wire jacket and positioning at least a portion of the wire harness with polyurethane bonding material applied thereon within a mold cavity of a molding die. The method further includes overmolding the portion of the wire harness within the molding die to form a molded item and activating the polyurethane bonding material to bond the wire jacket within the molded item.

In yet other embodiments, an electrical apparatus comprises a molded device having a molded portion and being formed via an overmolding process. The electrical apparatus includes a wire set at least partially overmolded within the device, the wire set having an outer sheath surrounding a plurality of wires. The molded portion surrounds a portion of the wire set. Additionally, the electrical apparatus includes polyurethane bonding material occurring between the outer sheath and the molded portion. The polyurethane bonding material bonds at least a portion of the wire set to the molded portion during the overmolding process.

In even other embodiments, a method comprises providing a wire set including an outer sheath surrounding a plurality of wires, the outer sheath having an outer surface. The method includes positioning at least a portion of the wire set within a mold cavity of a molding die and overmolding the portion of the wire set within the molding die to form the molded item. The molded item has a front surface with at least one hole extending in from the front surface or at least one prong extending out from the front surface, the molded item having a back surface opposite the front surface with a portion of the wire set extending out from the back surface. The overmolding includes filling the mold cavity with molten material configured to harden into overmold. Additionally, the method includes applying a polyurethane bonding material at the junction between the molded item and the portion of the wire set extending out from the back surface. The polyurethane bonding material is applied to the back surface of the molded item and the outer surface of the outer sheath to bond the molded item and the wire set.

In further embodiments, a method comprises providing a wire set including an outer sheath surrounding a plurality of wires and positioning at least a portion of the wire set within a mold cavity of a molding die. The method includes overmolding the portion of the wire set within the molding die to form the molded item having an outer surface. The overmolding includes filling the mold cavity with molten material configured to harden into overmold. Additionally, the method includes applying a polyurethane bonding material to the outer surface of the outer sheath to patch a portion of the molded item.

DESCRIPTION OF THE ILLUSTRATED EMBODIMENTS

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, and alterations and modifications in the illustrated systems, and further applications of the principles of the disclosure as illustrated therein are herein contemplated as would normally occur to one skilled in the art to which the disclosure relates.

In certain embodiments, the present disclosure is directed to a system which provides for polyurethane bonding of a component within a finished molded item during overmolding of the component (see FIGS. 1-5). The polyurethane material may be applied to the component in a variety of possible ways, as will be discussed in greater detail below, to provide a flexible seal between the component and the remainder of the molded item. The component having the polyurethane material applied thereto may be an electrical circuit molded within a die mold cavity to form a molded plug or socket device.

Figure 6:
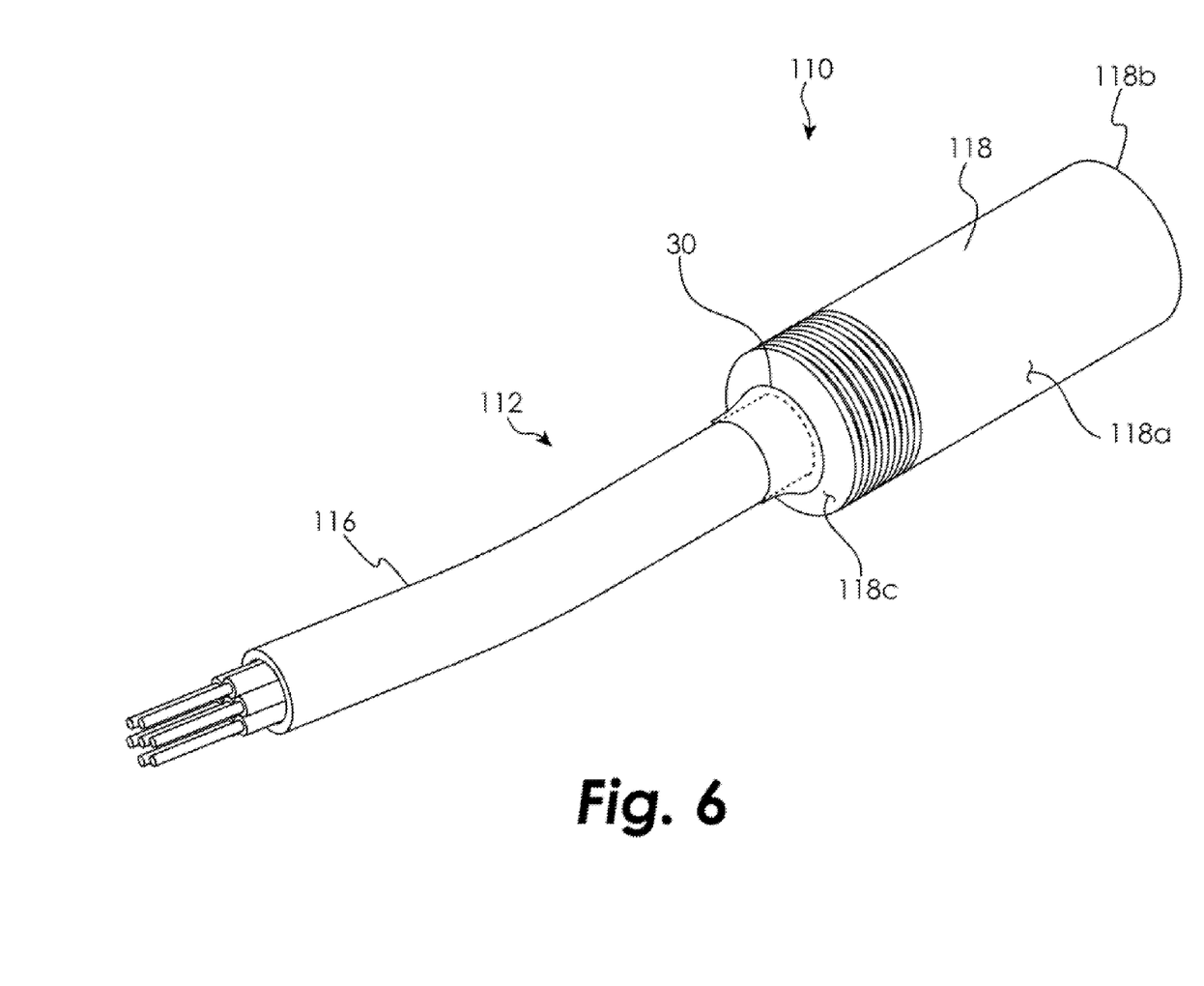
FIG. 6 is a perspective view of a molded socket according to another embodiment of the present disclosure.
Figure 7:
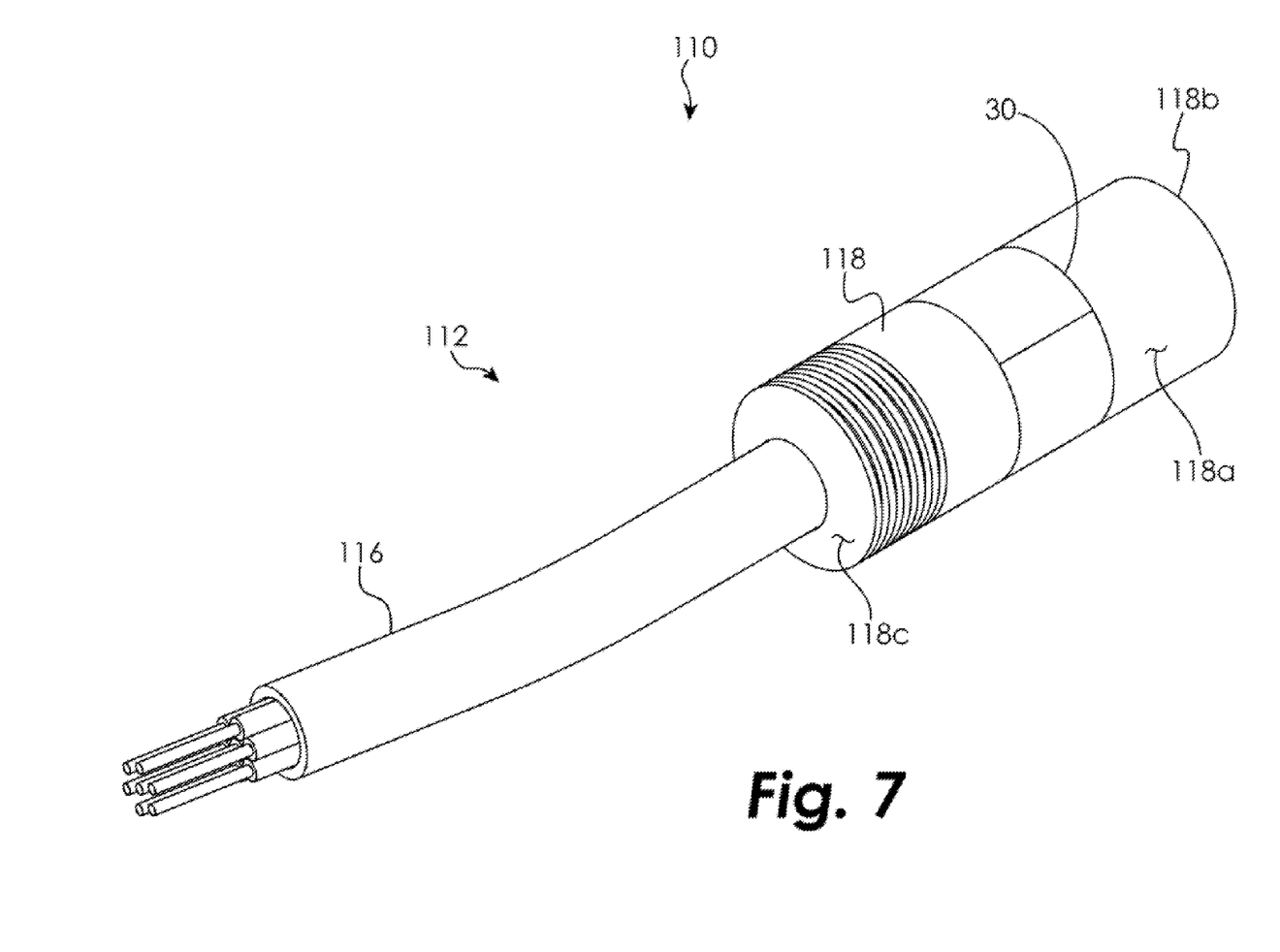
FIG. 7 is a perspective view of a molded socket according to yet another embodiment of the present disclosure.

In certain other embodiments, the present disclosure is directed to a system which provides for polyurethane bonding of a component within a finished molded item after overmolding of the component and/or patching of the finished molded item after overmolding (see FIGS. 6-7). As an example, the polyurethane bonding material may be applied to the junction between the molded item and the unmolded component extending out from the molded item. The component may be an electrical circuit molded within a die mold cavity to form a molded plug or socket device.

Figure 1:
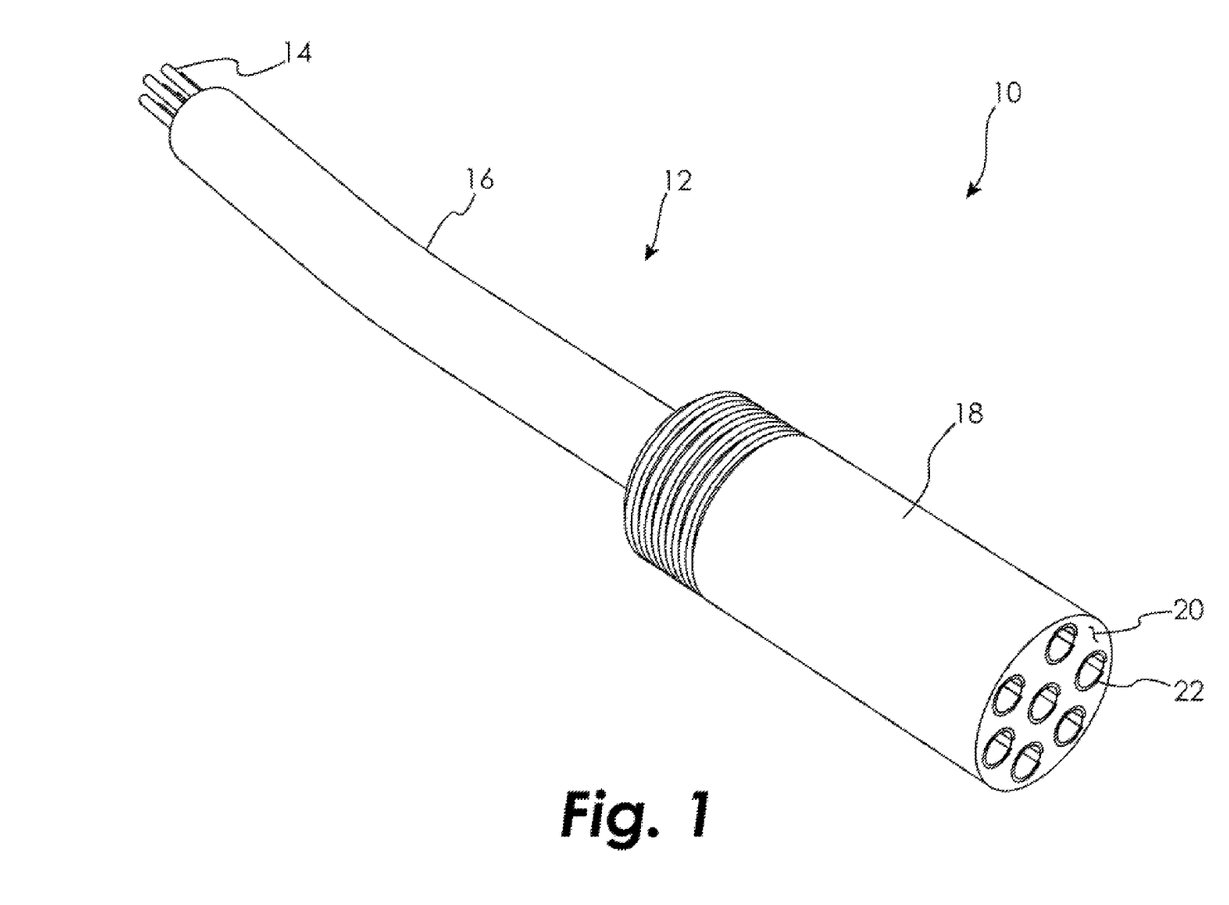
FIG. 1 is a perspective view of a molded socket according to an embodiment of the present disclosure.
Figure 2:
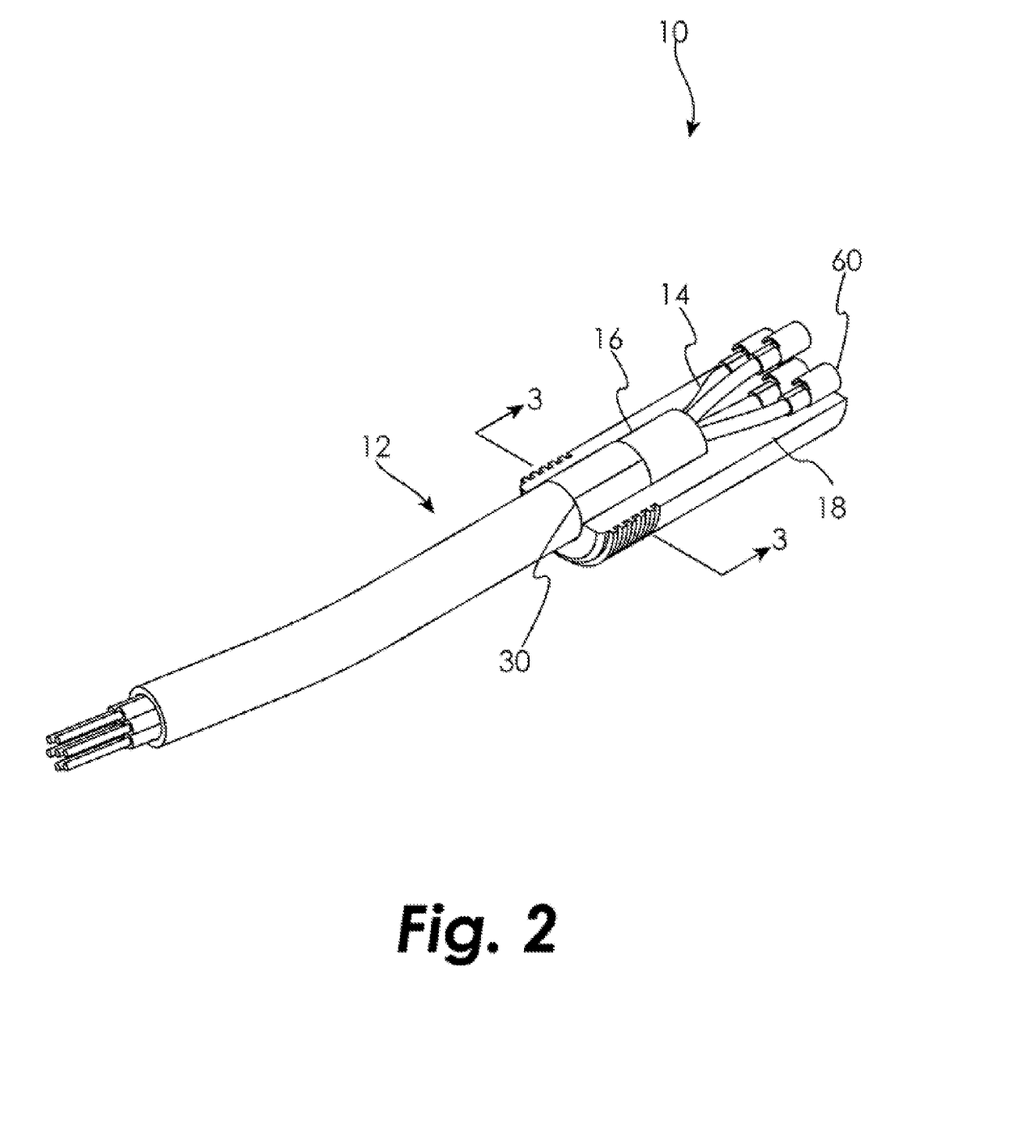
FIG. 2 is a perspective, partial cut-away view of a molded socket according to an embodiment of the present disclosure.
Figure 3:
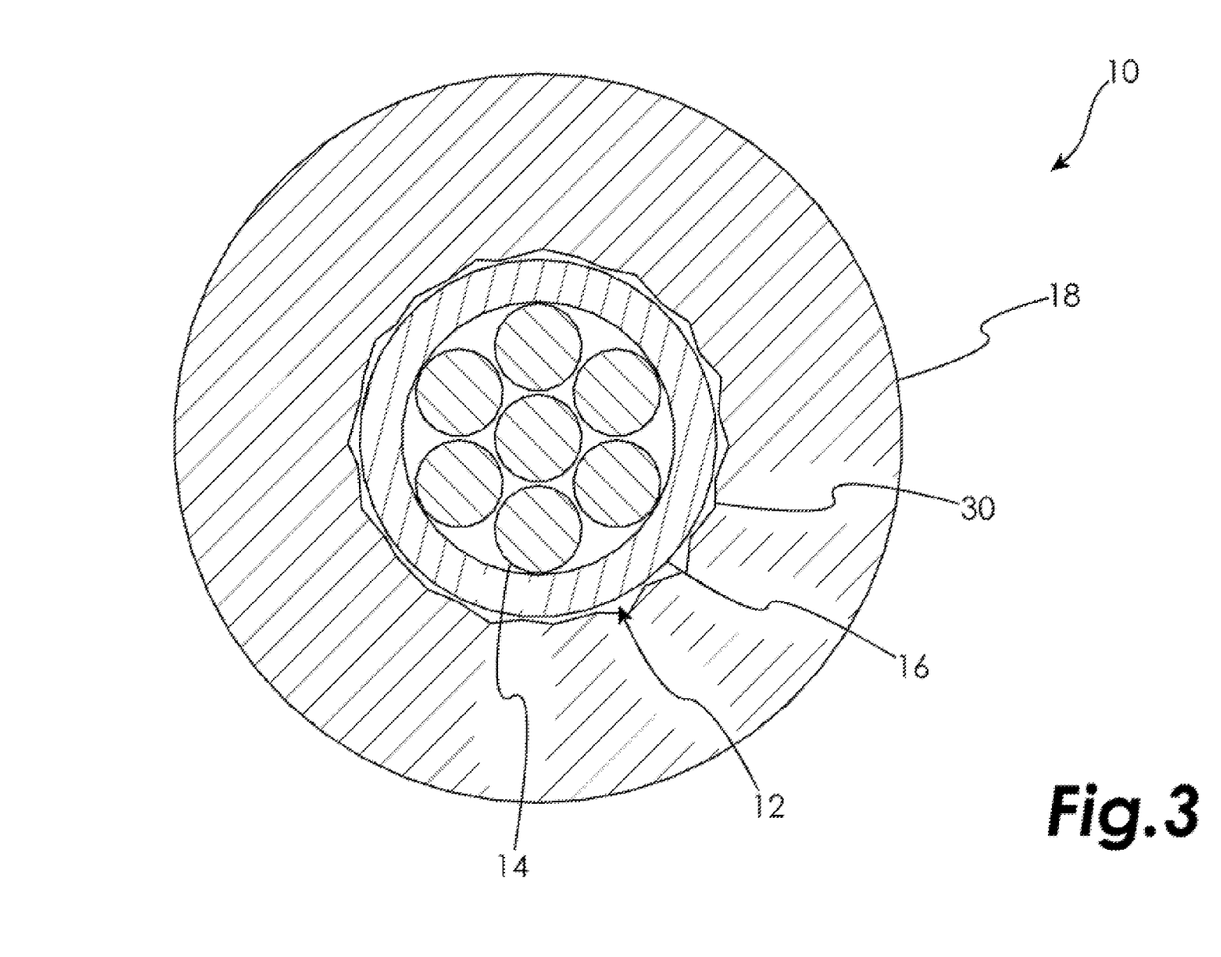
FIG. 3 is a cross-sectional view taken along section line 3-3 in FIG. 2.

Referring to FIGS. 1-3, there is shown an example molded socket 10 having an electrical circuit molded within the socket, with polyurethane bonding material used during the overmolding process. As best illustrated in FIG. 2, in certain embodiments the electrical circuit may be in the form of a wire harness or wire set 12 having a plurality of wires 14 surrounded by a wire jacket or cable or outer sheath 16. In some embodiments, the outer sheath 16 may be composed of polyvinyl chloride for example; however, it should be appreciated that various other appropriate materials may be used as would occur to one of ordinary skill in the art. The final molded socket 10 includes an overmolded portion 18 which has been overmolded around a portion of the wire set 12. Additionally, the molded socket 10 includes a front surface 20 and a plurality of slots or holes 22 defined in and extending inward from the front surface 20 at least partially into the molded socket 10. The holes 22 may be configured and arranged to receive electrical connectors, such as corresponding prongs of an electrical plug, in a manner as would occur to one of ordinary skill in the art. In the final molded socket 10, the wires 14 extend to the corresponding holes 20 such that they are operably connected to form the electrical socket.

In the illustrated embodiment, there are seven wires 14 provided in the wire set 12. However, it is contemplated that there may be more or less wires within wire set 12 as would occur to one skilled in the art. Additionally, in certain embodiments, the number of holes 22 parallels the number of wires 14 within wire set 12. Accordingly, in the illustrated embodiment, there are seven holes 22 corresponding to the seven wires 14. It should be appreciated that wire set 12 can be otherwise configured as would occur to one of ordinary skill in the art, with only one of the numerous possible examples being illustrated. Additionally, it should be appreciated that the representations in the accompanying figures are for illustrative purposes and are not intended to be detailed drawings showing all the components of a wire set and/or a molded socket. Additionally, the components which are shown are represented in simplified form for ease of understanding.

The molded socket 10 includes polyurethane bonding material 30 applied to the outer sheath 16 of wire set 12 prior to the overmolding process. The polyurethane material 30 may be operable to bond the wire set 12 with the overmolded portion 18 of the molded socket 10 during the overmolding process. In certain embodiments, the polyurethane material 30 creates a flexible seal between the wire set 12 and the molded portion 18 within the socket 10. The polyurethane material 30 may be operable to inhibit the intrusion of moisture into the socket 10 by preventing separation of the wire set 12 from the remainder of the socket 10.

The polyurethane material 30 used in accordance with present disclosure may be supplied in a variety of different forms as would occur to one of ordinary skill in the art. As in the illustrated embodiment, the polyurethane material 30 may be placed in the form of a film that is applied to the outer sheath 16 of the wire set 12. In some embodiments, the film of polyurethane material 30 may be wrapped around the circumference of the outer sheath 16 along at least one section of the sheath. Polyurethane film material may be made into various shapes and sizes as desired and depending on the size of the wire set and the final molded socket. In certain embodiments, a piece of polyurethane film having the desired dimensions may be cut from a roll of polyurethane film using known cutting techniques. The size, shape and configuration of the piece of polyurethane film material 30 shown in the accompanying figures may be altered as desired and is for illustration purposes only. Additionally, it should be appreciated that the piece of polyurethane film material 30 may be wrapped only partially around the circumference of the outer sheath 16 or may be wrapped multiple times.

In other embodiments, the polyurethane material may be sprayed on to the outer sheath 16 through a variety of appropriate spray techniques as would occur to one of ordinary skill in the art. An appropriate spraying technique may allow for consistent and optimal application of the polyurethane material. In yet other embodiments, the polyurethane material may be brushed on to the outer sheath 16. Using a brush to apply a more liquidized form of polyurethane material may provide the user with the ability to apply the polyurethane material to the outer sheath 16 in irregular shapes and/or to evenly apply the polyurethane material to irregular surface segments along the outer sheath 16. In even other embodiments, an at least partially liquidized form of the polyurethane material may be applied via a dropper dispenser or similar device. It should be appreciated that the polyurethane material may be formed and applied prior to the overmolding process in a variety of other appropriate manners as would occur to one of ordinary skill in the art. Additionally, the polyurethane bonding material may be applied to the outer sheath 16 at one or multiple locations along the other sheath that will be subject to the overmolding process and thus will become part of the finished molded item. In certain embodiments, the polyurethane bonding material may be colored as desired.

In certain embodiments, the polyurethane bonding material 30 applied to the outer sheath 16 may be handled by a user as necessary to perform the remaining steps of the method without substantially affecting the bonding effect of the material. Additionally, the use of polyurethane bonding material 30 may not substantially affect the physical properties of the material to which the polyurethane is applied, such as outer sheath 16. In alternative embodiments, the present disclosure contemplates the use or incorporation of other appropriate bonding materials having the same or similar properties to polyurethane to serve as the bonding material within the molded item, including other appropriate and similar polymeric materials.

Figure 4:
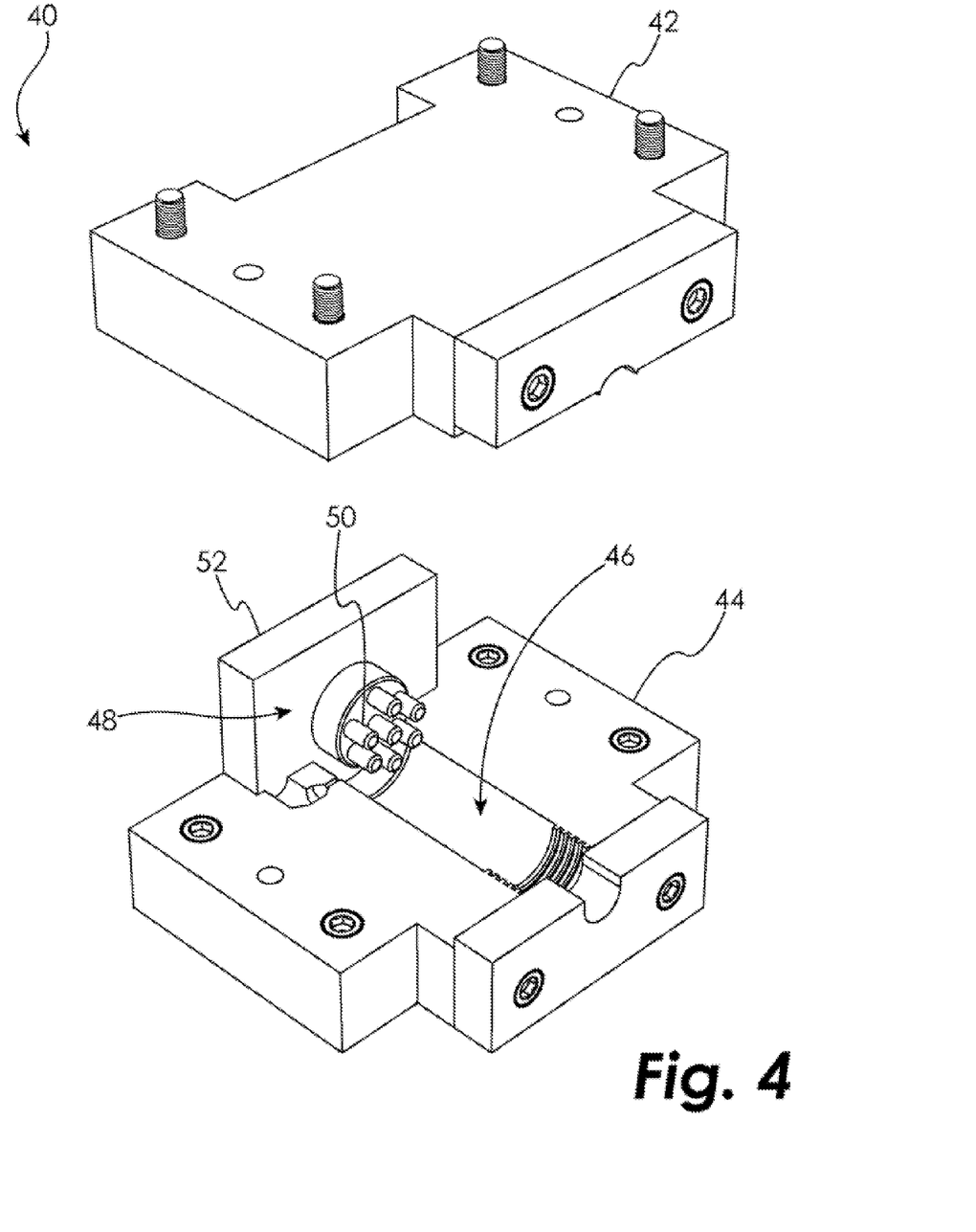
FIG. 4 is a perspective view of a die mold assembly according to an embodiment of the present disclosure.
Figure 5:
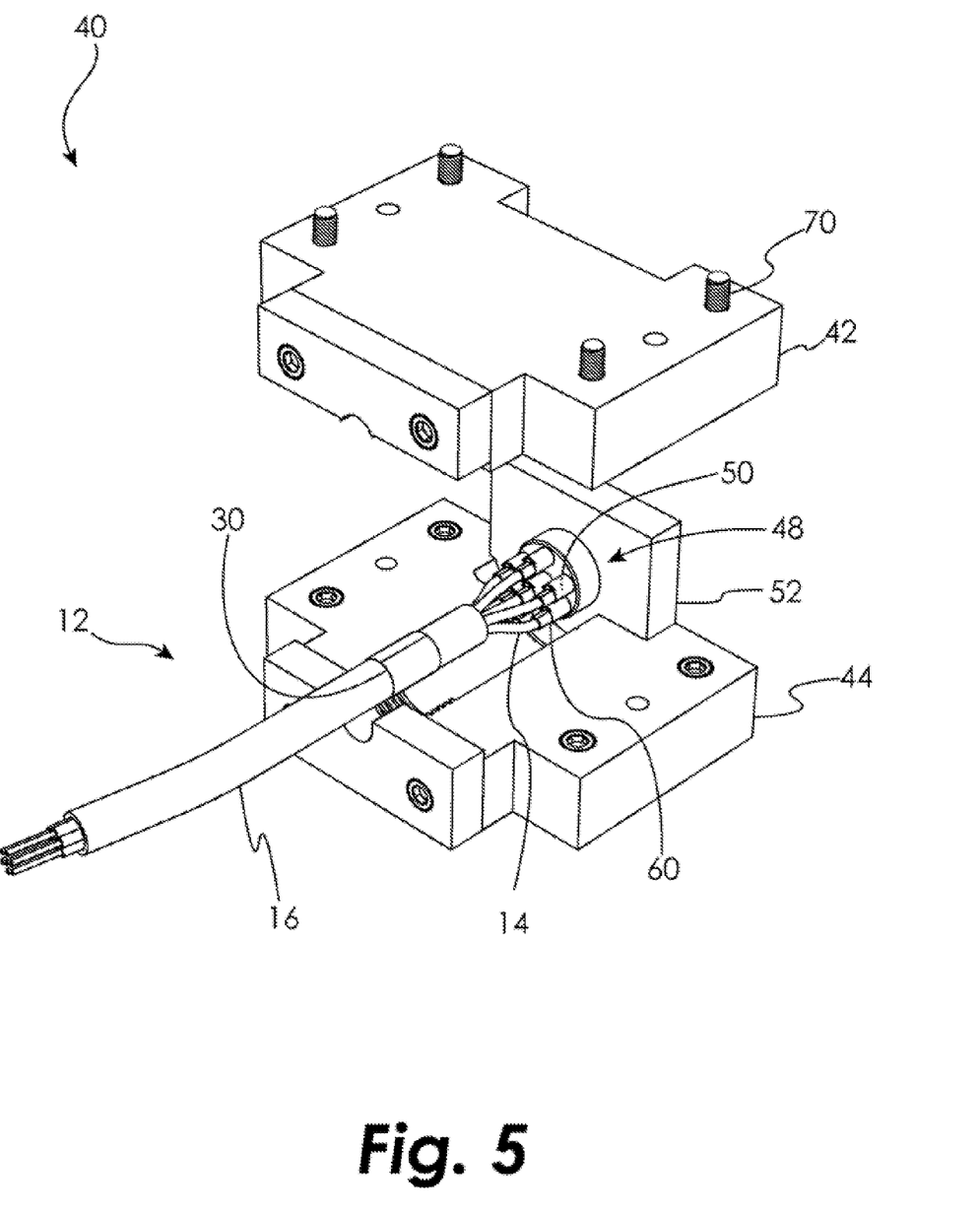
FIG. 5 is a perspective view of a wire set engaged with a die mold assembly according to an embodiment of the present disclosure.

To form the molded socket 10, a die mold which is arranged and configured to form the molded socket may be used. The die mold assembly 40 illustrated in FIGS. 4 and 5 is one non-limiting example of a die mold assembly which may be used to create the molded socket 10. As shown, die mold assembly 40 includes an upper mold component 42 and a lower mold component 44 configured to encase a portion of the wire set 12 to create the molded socket 10. In the particular illustrated embodiment, an optional slideable plate 52 is engaged with the lower mold component 44. The plate 52 is configured to slide with respect to lower mold component 44 to position the wire set 12 in the optimal position for the overmolding process. In alternative embodiments, the plate 52 may be integral with and non-moveable with respect to the lower mold component 44. The illustrated slideable plate 52 carries a socket piece 48 having a plurality of pins 50. As shown in FIG. 2, each of the wires 14 may include a sleeve 60 positioned at the end thereof to engage a pin 50. In such embodiments, the sleeves 60 may slide onto the pins 50 to ensure the proper positioning of the ends of the wires 14 adjacent the pins 50, as shown in FIG. 5.

As illustrated, the lower mold component 44 may include a channel 46 defined therein configured to at least partially receive the wire set 12. Additionally, the upper and lower mold components 42 and 44 may be configured to fit together to enclose a portion of the wire set 12 within channel 46. In certain embodiments, the upper and lower mold components 42 and 44 may include a plurality of aligned holes configured to receive fasteners, such as bolts 70 for example, to secure the mold components together for the overmolding process. It should be appreciated that the mold components may be secured together in a variety of other appropriate ways as would occur to one of ordinary skill in the art. In alternative embodiments, the mold components may remain positioned against each other for the overmolding process without the use of fasteners or other securing means. It should be appreciated that the die mold assembly 40 shown in FIGS. 4 and 5 is for illustration purposes only and is not critical to the present disclosure. It is contemplated that the die mold assembly used in accordance with the present method may be configured and arranged in a variety of different manners as would occur to one of ordinary skill in the art.

A particular example method of polyurethane bonding during an overmolding process will now be discussed with reference to FIGS. 1 through 5. In certain embodiments, a plurality of wires 14 may be arranged together within an outer sheath 16. Additionally, sleeves 60 may be attached to the ends of the wires 14 to allow for connection to pins 50 in the mold assembly 40. The polyurethane bonding material 30 may be applied to the outer sheath 16 in a variety of appropriate manners, a few of which are mentioned above. In the particular illustrated embodiment, of a piece of polyurethane film is wrapped around the outer sheath 16. The polyurethane bonding material 30 is applied to the outer sheath 16 along at least one section of the sheath 16 which will be positioned in the mold assembly 40 to ensure that the polyurethane bonding material 30 becomes part of the molded item.

The wire set 12 is positioned in the mold assembly 40 either before or after application of the polyurethane bonding material 30. In the particular illustrated embodiment, the sleeves 60 on the ends of the wires 14 are placed on the pins 50 of the socket piece 48, as shown in FIG. 5. In optional embodiments in which slideable plate 52 is present, once the connection between wire set 12 and socket piece 48 occurs, the plate 52 may be moved downward with respect to lower mold component 44 such that the wire set 12 is resting in the channel 46. The die mold components are used to form a molded item, such as the illustrated socket 10, via an overmolding process.

Upon proper positioning of the components within the die mold cavity, the components are then overmolded to create a molded item. In certain embodiments, the upper and lower die mold components 42 and 44, respectively, are brought together and a molten plastic material is injected into the die mold cavity according to a typical molding process. In certain embodiments, a polyvinylchloride material is injected into the die mold cavity, creating a molded item such as socket 10 composed of polyvinylchloride. However, it is contemplated that other materials and/or compositions thereof may be used as desired in creating molded socket 10. As shown in FIG. 2, the die mold forms the molded socket 10 with wire set 12 extending into molded socket 10 and the polyurethane material 30 bonding the wire set 12 with the interior of the socket 10 as a result of the molding process.

In certain embodiments, the heat from the molten plastic material injected into the die mold cavity activates the polyurethane material 30 and causes it to form a flexible seal or bond between the wire set 12 and the interior of the socket 10. In the particular illustrated embodiment, the outer sheath 16 is bonded with the overmolded portion 18 of the socket 10 via the polyurethane material 30. In other embodiments, an external heat source may be used to externally activate the polyurethane bonding material 30. The mechanism used to externally provide heat to polyurethane material 30 may be one of a variety of appropriate mechanisms as would occur to one of ordinary skill in the art. Following the overmolding process, the upper and lower die mold components, such as components 42 and 44, may be separated and the molded item, such as socket 10, may be removed from the die mold assembly 40.

In addition to the application of polyurethane bonding material prior to and/or during the overmolding process as discussed above, in other embodiments polyurethane bonding material may be applied after the overmolding process to enhance bonding and/or patch areas of the molded item. Referring to FIGS. 6-7, there is shown an example molded item 110, such as an electrical socket or plug as examples, having an electrical circuit molded within the item and with polyurethane bonding material applied after the overmolding process is completed. As illustrated, the electrical circuit may be in the form of a wire harness or wire set 112 having a plurality of wires surrounded by a wire jacket or cable or outer sheath 116. The final molded item 110 includes an overmolded portion 118 which has been overmolded around a portion of the wire set 112. In some embodiments, the overmolded portion 118 and/or the outer sheath 16 may be composed of polyvinyl chloride for example; however, it should be appreciated that various other appropriate materials may be used as would occur to one of ordinary skill in the art.

The molded item 110 may be formed using an appropriate die mold, such as die mold assembly 40 illustrated in FIG. 4. The molded item 110 is similar in design and configuration to molded socket 10 discussed above and therefore much of that discussion will not be repeated for the sake of brevity. Additionally, it should be appreciated that the representations in the figures are for illustrative purposes and are not intended to be detailed drawings showing all the components of a wire set and/or a molded item. Further, the components which are shown are represented in simplified form for ease of understanding.

The illustrated overmolded portion 118 includes an outer cylindrical surface 118a, a front surface 118b and an opposite back surface 118c. As illustrated, a portion of wire set 112 extends out from back surface 118c. In embodiments in which the molded item 110 is an electrical socket, the item includes at least one hole extending in from the front surface 118b in communication with at least one wire in the wire set 112. In other embodiments in which the molded item 110 is an electrical plug, the item includes a plurality of prongs extending out from the front surface 118b, with the wires in the wire set 112 forming part of the prongs.

In the particular embodiment illustrated in FIG. 6, the molded item 110 includes polyurethane bonding material 30 applied at the junction between overmolded portion 118 and the outer sheath 116 after the overmolding process. As shown, a portion of material 30 is applied to back surface 118c and a portion is applied to the outer sheath 116 extending out from back surface 118c. The polyurethane material 30 may be operable to enhance the bonding between the wire set 112 and the overmolded portion 118 following the overmolding process. In certain embodiments, the polyurethane material 30 creates a flexible seal between the wire set 112 and the molded portion 118 at the juncture therebetween. The polyurethane material 30 may also be operable to inhibit the intrusion of moisture into the item 110.

In the particular embodiment illustrated in FIG. 7, polyurethane bonding material 30 is applied to a portion of the cylindrical outer surface 118a of portion 118. In certain situations, it may be desirable to apply a patching mechanism to the overmolded portion 118 following the overmolding process. In this way, the polyurethane bonding material 30 may be used as a patching mechanism for the portion 118 as needed.

As discussed above, material 30 may be supplied and applied in a variety of appropriate manners, including the use of a thin polyurethane film, spraying or brushing on a more liquidized form of the polyurethane material, or using a dropper dispenser or similar device to apply the polyurethane material, to name a few non-limiting examples. In the embodiments illustrated in FIGS. 6 and 7, a piece of polyurethane film is applied to the desired components. In certain embodiments, the polyurethane bonding material 30 applied after the overmolding process is complete, such as in FIGS. 6 and 7, may be allowed to dry or cure at ambient conditions without the application of heat. In other embodiments, a heat source may be used to activate the polyurethane bonding material 30.

It should be appreciated that although the present disclosure discusses the formation of a molded socket 10 and a molded item 110, it is contemplated that numerous types of molded items can be formed via incorporating the polyurethane bonding material, with the molded socket 10 and molded item 110 being non-limiting examples only. As another example, the polyurethane bonding material may be used during the formation of a molded plug, such as a molded plug configured to electrically connect with the molded socket 10. In addition to the numerous other final molded items contemplated by the present disclosure, it is contemplated that a variety of other appropriate components, electrical or otherwise, may be molded within the final molded item. It is contemplated that the polyurethane bonding material may be used to assist in bonding items together as part of numerous types of overmolding processes.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:

1. A method for making a molded item, comprising:
   providing a wire set including an outer sheath surrounding a plurality of wires, the outer sheath having an outer surface;
   applying a polyurethane bonding material to at least a portion of the outer surface of the outer sheath;
   positioning at least the portion of the wire set with polyurethane bonding material within a mold cavity of a molding die;
   overmolding the portion of the wire set within the molding die to form the molded item, wherein the overmolding includes filling the mold cavity with molten material and covering substantially all of the polyurethane bonding material with the molten material, the molten material producing an amount of heat and being configured to harden into overmold, wherein the heat operates to activate the polyurethane bonding material to bond the wire set with the overmold within the molded item with substantially all of the polyurethane bonding material being encompassed by the overmold.

2. The method of claim 1, wherein the outer sheath is composed of polyvinylchloride.

3. The method of claim 1, wherein the molten material is polyvinylchloride.

4. The method of claim 1, wherein the applying includes applying a film of polyurethane bonding material onto at least a portion of the outer surface of the outer sheath.

5. The method of claim 1, further comprising providing a piece of polyurethane film to be used as the polyurethane bonding material.

6. The method of claim 1, wherein the applying includes spraying the polyurethane bonding material onto at least a portion of the outer surface of the outer sheath.

7. The method of claim 1, wherein the applying includes brushing the polyurethane bonding material onto at least a portion of the outer surface of the outer sheath.

8. The method of claim 1, wherein the outer sheath is substantially cylindrical in shape and the applying includes wrapping the polyurethane bonding material around the circumference of the outer sheath along a cylindrical portion of the outer sheath.

9. The method of claim 1, wherein the molded item is selected from the group consisting of an electrical plug and an electrical socket.

10. A method, comprising:
    providing a wire harness having a wire jacket surrounding at least one wire, the wire jacket having an outer surface;
    applying a polyurethane bonding material to at least a portion of the outer surface of the wire jacket;
    positioning at least the portion of the wire harness with polyurethane bonding material applied thereon within a mold cavity of a molding die;
    overmolding the portion of the wire harness within the molding die to form a molded item, wherein substantially all of the polyurethane bonding material is overmolded within the molding die; and
    activating the polyurethane bonding material to bond the wire jacket within the molded item.

11. The method of claim 10, wherein the activating includes applying heat from an external heat source.

12. The method of claim 10, wherein the overmolding includes filling the mold cavity with molten plastic and covering substantially all of the polyurethane bonding material, the molten plastic producing an amount of heat, wherein the heat produced by the molten plastic performs the activating the polyurethane bonding material.

13. The method of claim 10, wherein the applying includes applying a film of polyurethane bonding material onto at least a portion of the outer surface of the wire jacket.

14. A method, comprising:
providing a wire set including an outer sheath surrounding a plurality of wires, the outer sheath having an outer surface;
positioning at least a portion of the wire set within a mold cavity of a molding die;
overmolding the portion of the wire set within the molding die to form the molded item, the molded item having a front surface with at least one hole extending in from the front surface or at least one prong extending out from the front surface, the molded item having a back surface opposite the front surface with a portion of the wire set extending out from the back surface, wherein the overmolding includes filling the mold cavity with molten material configured to harden into overmold; and
applying a polyurethane bonding material at the junction between the molded item and the portion of the wire set extending out from the back surface, wherein the applying includes applying a portion of the polyurethane bonding material to the back surface and applying a portion of the polyurethane bonding material to the outer surface of the outer sheath to bond the molded item and the wire set.

15. A method, comprising:
providing a wire set including an outer sheath surrounding a plurality of wires;
positioning at least a portion of the wire set within a mold cavity of a molding die;
overmolding the portion of the wire set within the molding die to form the molded item having an outer surface, wherein the overmolding includes filling the mold cavity with molten material configured to harden into overmold; and
applying a polyurethane bonding material to the outer surface of the overmold to patch a portion of the molded item, wherein the applying occurs after the overmolding.

* * * * *